United States Patent
Suzuki

(10) Patent No.: US 8,380,332 B2
(45) Date of Patent: Feb. 19, 2013

(54) AUDIO SIGNAL PROCESSING DEVICE, SPEAKER DEVICE, VIDEO DISPLAY DEVICE, AND CONTROL METHOD

(75) Inventor: Masato Suzuki, Shizuoka (JP)

(73) Assignee: Yamaha Corporation, Hamamatsu-shi (JP)

( * ) Notice: Subject to any disclaimer, the term of this patent is extended or adjusted under 35 U.S.C. 154(b) by 563 days.

(21) Appl. No.: 12/543,886

(22) Filed: Aug. 19, 2009

(65) Prior Publication Data
US 2010/0057233 A1    Mar. 4, 2010

(30) Foreign Application Priority Data
Aug. 26, 2008    (JP) ................................ 2008-217237

(51) Int. Cl.
    *G06F 17/00*    (2006.01)
(52) U.S. Cl. ............................................. 700/94
(58) Field of Classification Search ............. 700/94; 381/77, 104, 107; 455/3.06; 369/1–12; 704/500–504; 71/303, 304
    See application file for complete search history.

(56) References Cited

U.S. PATENT DOCUMENTS

| 6,563,430 | B1 * | 5/2003 | Kemink et al. ............. 340/8.1 |
| 7,305,506 | B1 * | 12/2007 | Lydon et al. ............... 710/105 |
| 2004/0042350 | A1 | 3/2004 | Yamanushi et al. |
| 2007/0201705 | A1 * | 8/2007 | Dorogusker et al. ......... 381/104 |
| 2008/0157991 | A1 * | 7/2008 | Raghunath et al. ........ 340/686.1 |
| 2008/0195879 | A1 * | 8/2008 | Asmi et al. .................... 713/323 |
| 2008/0270814 | A1 * | 10/2008 | Starr et al. .................... 713/323 |
| 2009/0063744 | A1 * | 3/2009 | Krueger et al. ............... 710/303 |
| 2009/0326949 | A1 * | 12/2009 | Douthitt et al. .............. 704/260 |

FOREIGN PATENT DOCUMENTS

| JP | 2000-152352 A | 5/2000 |
| JP | 2004-22139 A | 1/2004 |
| JP | 2005-79614 A | 3/2005 |
| JP | 2008-98850 A | 4/2008 |

OTHER PUBLICATIONS

Notice of Reason for Rejection dated Jul. 31, 2012 with English translation (five (5) pages).

* cited by examiner

*Primary Examiner* — Andrew C Flanders
(74) *Attorney, Agent, or Firm* — Crowell & Moring LLP

(57) ABSTRACT

In an audio signal processing device, an acquisition unit acquires an audio signal. A signal processing unit applies predetermined signal processing to the audio signal acquired by the acquisition unit when the signal processing unit is supplied with power, and outputs the audio signal. A communication unit establishes wireless communication with a communication device for connection to the communication device. A communication controller controls the communication unit to commence the connection to the communication device by the wireless communication when a predetermined connection condition is satisfied, and to sever the connection to the communication device when a predetermined disconnection condition is satisfied. A power control unit starts supply of power to the signal processing unit when the connection to the communication device is commenced, and stops the supply of power to the signal processing unit when the connection to the communication device is severed.

14 Claims, 4 Drawing Sheets

AUDIO SIGNAL PROCESSING DEVICE, SPEAKER DEVICE, VIDEO DISPLAY DEVICE, AND CONTROL METHOD

BACKGROUND OF THE INVENTION

1. Technical Field of the Invention

The present invention relates to power control technology for an audio signal processing device.

2. Description of the Related Art

Generally, electric devices capable of being remotely controlled using a remote-controller or the like, have been designed to conduct a variety of control functions corresponding to commands generated from the remote-controller handled by a user. In the meantime, one example of the above-mentioned electric devices has been described in Japanese Patent Laid-open Publication No. 2000-152352, which is hereby incorporated by reference. The above-mentioned Japanese Patent Laid-open Publication No. 2000-152352 has disclosed an electric device that detects propagation intensity of signals generated from wireless communication equipment without using a remote-controller such that the electric device conducts control functions according to predetermined control items.

However, most amplifiers for amplifying audio signals for use in an amplifying device or a speaker device, or the like generally consume a large amount of power. When such amplifiers are not in use, it is preferable that power is not supplied to them. In contrast, when the amplifier begins to be powered on or is then powered off, there is a need for a user to send a command to the speaker device using a remote-controller.

Also, in order to generate reproduction sound played in a portable audio player or the like from the speaker device, the portable audio player should be connected to the speaker device, and the user should command the speaker device to power on. Therefore, if the user desires to listen to the reproduction sound through another speaker device installed at another place, the speaker device (i.e., an old speaker device) connected to the portable audio player must be replaced with another speaker device (i.e., a new speaker device) by the user, and the user must command the old speaker device to power off while simultaneously commanding the new speaker device to power on, resulting in occurrence of unnecessary time in operation.

SUMMARY OF THE INVENTION

The present invention has been made to overcome the above problems, and it is an object of the present invention to provide an audio signal processing device, a speaker device, a video display device, and a control method, which easily control an operation for supplying the amplifier with power.

In order to solve the above problems, an audio signal processing device according to the present invention comprises: an acquisition unit that acquires an audio signal; a signal processing unit that applies predetermined signal processing to the audio signal acquired by the acquisition unit when the signal processing unit is supplied with power, and that outputs the audio signal; a communication unit that establishes wireless communication with a communication device for connection to the communication device; a communication controller that controls the communication unit to commence the connection to the communication device by the wireless communication when a predetermined connection condition is satisfied, and to sever the connection to the communication device when a predetermined disconnection condition is satisfied; and a power control unit that starts supply of power to the signal processing unit when the connection to the communication device is commenced, and that stops the supply of power to the signal processing unit when the connection to the communication device is severed.

Another audio signal processing device according to the present invention comprises: an acquisition unit that acquires an audio signal; a signal processing unit that applies predetermined signal processing to the audio signal acquired by the acquisition unit when the signal processing unit is supplied with power, and that outputs the audio signal; a communication unit that searches a communication device present in a communication range after power is supplied to the communication unit, and that establishes wireless communication for connection to the communication device which is searched by the communication unit; a communication controller that controls the communication unit to commence the connection to the communication device by the wireless communication when a predetermined connection condition is satisfied, and that severs the connection to the communication device when a predetermined disconnection condition is satisfied; and a power control unit that holds a first power-supply state where the communication unit is supplied with power and the signal processing unit is not supplied with power before the connection by the wireless communication to the communication device is commenced, that switches the first power-supply state to a second power-supply state where the communication unit is supplied with power and the signal processing unit is supplied with power when the connection to the communication device is commenced, and that restores the first power supply state where the communication unit is supplied with power and the signal processing unit is not supplied with power when the connection to the communication device is severed.

In a preferable aspect, the acquisition unit acquires the audio signal which is wirelessly received from the communication device after the connection is commenced.

In another preferable aspect, the communication unit receives a control signal indicating parameters of the signal processing from the communication device after the connection is commenced, and the signal processing unit applies the signal processing to the audio signal acquired by the acquisition unit according to the parameters indicated by the control signal received by the communication unit, and outputs the audio signal.

In another preferable aspect, the communication unit includes a detection unit that detects an intensity of a radio field propagated from the communication device, and the communication controller determines whether the predetermined connection condition is satisfied or not according to the intensity of the radio field detected by the detection unit.

In another preferable aspect, the communication unit includes a detection unit that detects an intensity of a radio field propagated from the communication device, and the communication controller determines whether the predetermined disconnection condition is satisfied or not according to the intensity of the radio field detected by the detection unit.

In another preferable aspect, the communication unit transmits a request signal to the communication device, and receives a response signal to the request signal from the communication device, and the communication controller determines whether the predetermined connection condition is satisfied or not according to the response signal received by the communication unit.

In another preferable aspect, the power control unit starts supply of power to the signal processing unit when the power control unit additionally receives a predetermined signal from the communication device after the connection is commenced.

In another preferable aspect, a speaker device according to the present invention comprises: the above described audio signal processing device; and a sound generator that generates sound according to the audio signal outputted from the signal processing unit of the audio signal processing device.

A video display device according to the present invention comprises: the above described speaker device; and a display unit that has a display screen and that displays image on the display screen when the display unit is supplied with power, wherein the acquisition unit additionally acquires a video signal, the display unit displays image according to the video signal acquired by the acquisition unit, and the power control unit starts supply of power to the signal processing unit and the display unit when the connection to the communication device is commenced, and stops supply of power to the signal processing unit and the display unit when the connection to the communication device is severed.

A control method according to the invention is provided for use in an audio signal processing device, which includes an acquisition unit for acquiring an audio signal, a signal processing unit for applying predetermined signal processing to the audio signal acquired by the acquisition unit after power is supplied and outputting the audio signal, and a communication unit for establishing wireless communication for connection to a communication device. The inventive control method comprises: a connection start control step for controlling the communication unit to commence the connection to the communication device by the wireless communication when a predetermined connection condition is satisfied; a power-supply start control step for starting supply of power to the signal processing unit when the connection to the communication device is commenced; a connection-severing control step for controlling the communication unit to sever the connection to the communication device when a predetermined disconnection condition is satisfied; and a power-supply stop control step for stopping supply of power to the signal processing unit when the connection to the communication device is severed.

Another control method according to the invention is provided for use for use in an audio signal processing device, which includes an acquisition unit for acquiring an audio signal, a signal processing unit for applying predetermined signal processing to the audio signal acquired by the acquisition unit after power is supplied and outputting the audio signal, and a communication unit for searching a communication device present in a communication range after power is supplied and establishing wireless communication for connection to the communication device which is searched. The inventive control method comprises: a first power-supply control step for holding a first power-supply state where the communication device is supplied with power and the signal processing unit is not supplied with power before the connection to the communication device is commenced; a connection-commencing control step for controlling the communication unit to commence the connection to the communication device by the wireless communication when a predetermined connection condition is satisfied; a power-supply control step for switching the first power-supply state to a second power-supply state where the communication device is supplied with power and the signal processing unit is supplied with power when the connection to the communication unit is commenced; a connection-severing control step for controlling the communication unit to sever the connection to the communication device when a predetermined disconnection condition is satisfied; and a power-supply stop control step for restoring the first power-supply state where the communication device is supplied with power and the signal processing unit is not supplied with power when the connection to the communication device is severed.

The present invention provides an audio signal processing device, a speaker device, a video display device, and a control method, which can easily control an operation for supplying a signal processing device with power.

DETAILED DESCRIPTION OF THE INVENTION

Hereinafter, embodiments of the present invention will be described in detail.

<Embodiments>

Figure 1:
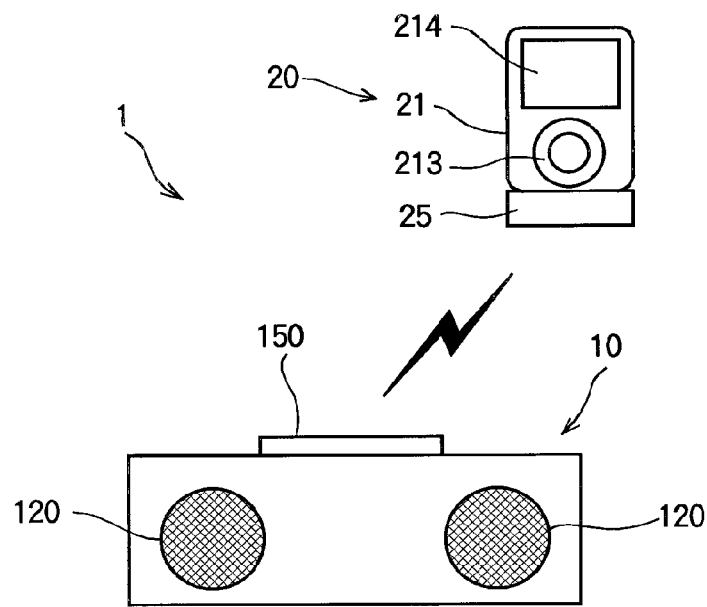
FIG. 1 is a schematic diagram illustrating an audio system according to an embodiment of the present invention.
Figure 2:
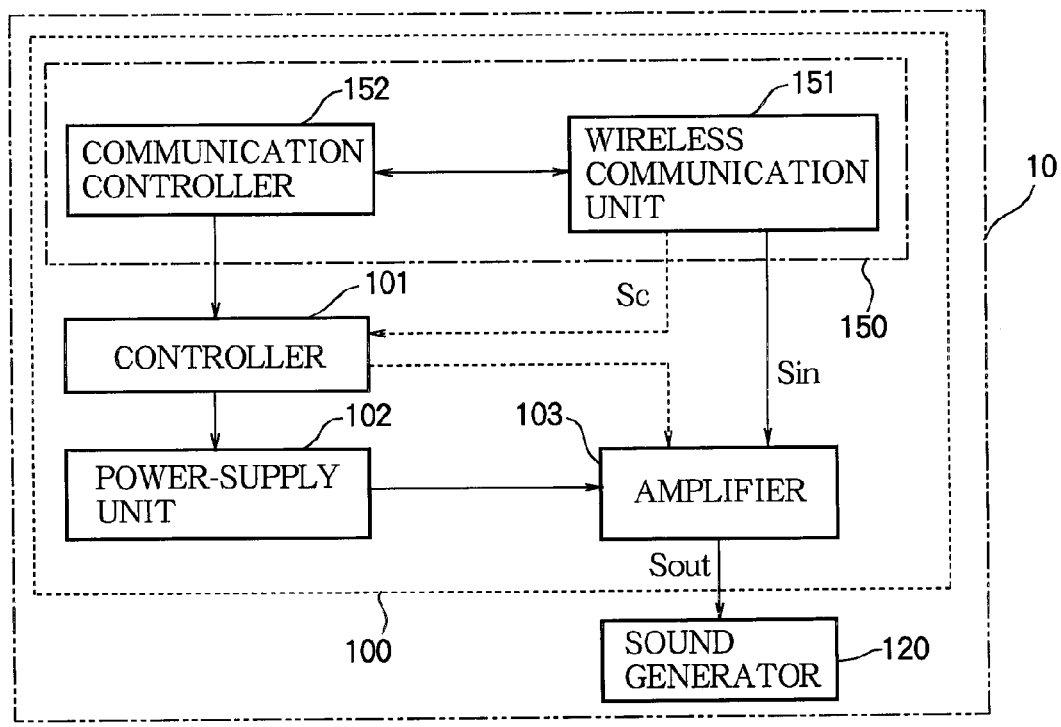
FIG. 2 is a block diagram illustrating a speaker device according to an embodiment of the present invention.
Figure 3:
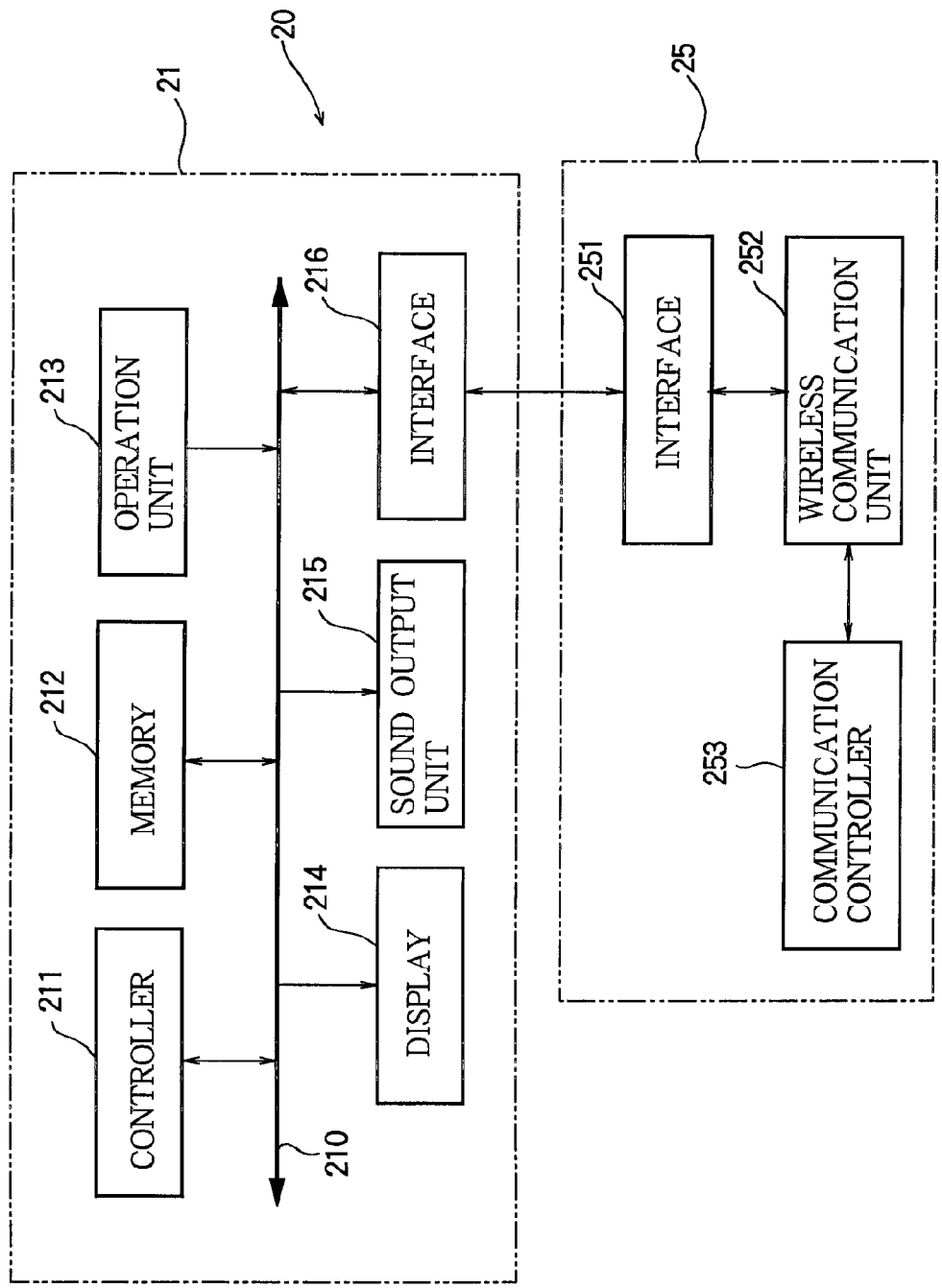
FIG. 3 is a block diagram illustrating a communication device according to an embodiment of the present invention.

As shown in FIG. 1, an audio system 1 according to an embodiment of the present invention includes a speaker device 10 and a communication device 20. FIG. 1 is a schematic diagram illustrating the audio system 1. The communication device 20 is formed by connecting a portable audio device 21 to a communication module 25. Wireless communication is carried out between the communication module 25 of the communication device 20 and a communication unit 150 of the speaker device 10. Constituent components of the speaker device 10 will hereinafter be described with reference to FIG. 2, and constituent components of the communication device 20 will hereinafter be described with reference to FIG. 3. FIG. 2 is a block diagram illustrating the speaker device 10. FIG. 3 is a block diagram illustrating the communication device 20.

As shown in FIG. 2, the speaker device 10 includes the audio signal processing device 100 and a sound generation unit 120. The audio signal processing device 100 includes a controller 101, a power-supply unit 102, an amplifier 103, and a communication unit 150. The communication unit 150 includes a wireless communication unit 151 driven by a power-supply signal and a communication controller 152.

The wireless communication unit 151 establishes wireless communication in a physical level by searching for the communication device 20 present in a communication range corresponding to an output radio field intensity of a communication device 20 (herein the establishment of the communication device will hereinafter be referred to as "the establishment in the physical level"), and communicates with the found communication device 20 by controlling the communication controller 152.

Also, the wireless communication unit 151 is controlled to connect to the communication device 20 by the communication controller 152 as shown in the following description. During the connection state between the wireless communication unit 151 and the communication device 20, the wireless communication unit 151 receives an encoded audio signal (Sin) transferred from the communication device 20, and decodes the encoded audio signal (Sin), such that the communication unit 151 acquires and outputs the audio signal (Sin) (in this example, a 2-channel stereo audio signal). That is, the connection state is held between the speaker device 10 and the communication device 20 such that the speaker device 10 can receive and acquire the audio signal (Sin) from the communication device 20.

The communication controller 152 controls communication of the wireless communication unit 151. The communication controller 152 performs the above control operation by transferring a signal indicating control contents to the wireless communication unit 151. The communication controller 152 controls to connect with the communication device 20, which has established wireless communication at the physical level by the wireless communication unit 151. In this case, if a predetermined connection condition is satisfied, the communication controller 152 controls the wireless communication unit 151 to establish a connection with the communication device 20 in logical level. In addition, if a predetermined disconnection condition is satisfied when the communication controller 152 is connected to the communication device 20, the connection between the communication controller 152 and the communication device 20 is severed such that the above connection is closed. The connection condition and the disconnection condition will be described in detail.

Also, the communication controller 152 outputs connection information, indicating a connection state between the communication controller 152 and the communication device 20, to the controller 101. Accordingly, the controller 101 may recognize whether the speaker device 10 is connected to the communication device 20 by wireless communication. In addition, the communication controller 152 may change the radio field intensity generated from the wireless communication unit 151 in response to a handling or operation of an operation unit (not shown in the drawings) or the like, such that the communication range may also be changed.

The power-supply unit 102 is used as a power source for supplying the amplifier 103 with power, and the controller 101 controls the starting and stopping of the above power-supplying operation. In addition, a receiver of the power is not limited to only the amplifier 103, but may include an unshown processing circuit (for example, a circuit or the like to perform signal processing on an audio signal). However, a part, which is present in either the communication unit 150 or the controller 101 to control the power-supply unit 102, is powered on regardless of the starting or stopping of the power-supplying operation from the power-supply unit 102 to the amplifier 103. In addition, the power supplied to the amplifier 103 may be generated from an inner part (e.g., a battery) of the speaker device, or may also be fed from an external part of the device through an electric outlet or the like. The above power-supplying operation for the communication unit 150 is not limited to only the power from the power-supply unit 120, but may also be implemented by another power-supply unit different from the above power-supply unit 102.

If the amplifier 103 receives the power from the power-supply unit 102, the amplifier 103 starts driving and performs an initialization process, and amplifies an input audio signal (i.e., an audio signal (Sin) transmitted from the wireless communication unit 151) with a predetermined amplification factor, such that the amplifier 103 outputs the amplified audio signal (Sout). In addition, upon receiving a control signal from the controller 101, the amplifier 103 may slowly change a first amplification factor to a higher second amplification factor during a predetermined time starting from the power-supply beginning time at which the amplifier 103 receives the power from the power-supply unit 102. In this way, the amplification factor of the amplifier 103 may be established.

The controller 101 recognizes its connection status relative to the communication device 20 upon receiving connection information from the communication controller 152. If the connection by the wireless communication between the speaker device 10 and the communication device 20 is commenced, the controller 101 controls the power-supply unit 102 to power on the amplifier 103. On the other hand, if the connection between the speaker device 10 and the communication device 20 is severed, the controller 101 controls the power-supply unit 102 to power off the amplifier 103.

In other words, in this example, the power-supply unit 102 provides the amplifier 103 with power in an active period from the beginning time of the connection between the speaker device 10 and the communication device 20 to the severing time of the connection, and the amplifier 103 is powered off in the rest period except other than the above active period. The above operation for controlling the power-supply unit 102 and the amplifier 103 may be performed, for example, when the controller 101 outputs a signal indicating control content to the power-supply unit 102.

In this case, for example, a timing point at which the power-supply unit 102 controlled by the controller 101 starts powering on the amplifier 103 may be equal to another timing point at which a wireless communication connection between the speaker device 10 and the communication device 20 is commenced. For another example, after the lapse of a predetermined time from the beginning of the wireless communication connection, the power-supply unit 102 may start providing the amplifier 103 with power. Meanwhile, a timing point at which the power-supply unit 102 stops providing the amplifier 103 with power may coincide with another timing point at which the wireless communication connection between the speaker device 10 and the communication device 20 is severed. Otherwise, after the lapse of a predetermined time from the severing time of the wireless communication connection, the power-supply unit 102 may stop providing the amplifier 103 with power.

The sound generator 120 includes a speaker for an L-channel and another speaker for an R-channel, receives the audio signal (Sout) from the amplifier 103, and audibly outputs signals of individual channels through speakers for the individual channels, respectively. The above-mentioned description has disclosed constituent components of the speaker device 10.

Next, constituent components of the communication device 20 will hereinafter be described. As shown in FIG. 3, the communication device 20 includes a portable audio device 21 and a communication module 25. The portable audio device 21 includes a controller 211, a memory 212, an operation unit 213, a display 214, a sound output unit 215, and an interface 216, which are interconnected via a bus 210 and receive power from an unshown power-supply unit (for example, a power source or the like). Also, the communication module 25 includes an interface 251, a wireless communication unit 252, and a communication controller 253.

The portable audio device 21 and the communication module 25 are interconnected via the interfaces 251 and 216. In this example, since the communication module 25 is connected to the portable audio device 21, it receives power from the power-supply unit (not shown) of the portable audio device 21 via the interfaces 251 and 216. Therefore, if the communication module 25 is separated from the portable audio device 21 such that the physical connection between the communication 25 and the portable audio device 21 is released, individual components of the communication module 25 stop their operation. In addition, the communication module 25 may include a battery, for powering on the individual components, therein.

The controller 211 includes a Central Processing Unit (CPU), a Read Only Memory (ROM), and a Random Access Memory (RAM). The CPU reads a control program from the ROM using the RAM and executes the read control program, such that individual components of the portable audio device 21 are controlled through the bus 210. Contents controlled by the controller 211 will be described in detail.

The memory 212 may be a mass storage device, for example, a Hard Disc Drive (HDD), a non-volatile memory, or the like. The memory 212 records and stores data of audio signals and data of video signals, and the like.

The operation unit 213 includes controls for allowing a user to perform desired operations. If the user operates the operation unit 213, an operation signal indicating contents of this user operation is transferred to the controller 211.

The display 214 is a display device such as a liquid crystal display (LCD) for displaying images, and displays video signals entered by the control of the controller 211.

The sound output unit 215 has a connection terminal connected to a sound generator such as headphones, and provides the sound generator with audio signals entered by the control of the controller 211.

The interface 216 is connected to an external device, and is used as a connection terminal for conducting input/output (I/O) operations of various data. In this example, the communication module 25 is connected to the interface 216, and the audio signal (Sin) entered by the control of the controller 211 is transferred to the interface 251 of the communication module 25.

In response to an operation of the user who operates the operation unit 213, the controller 211 reads and reproduces data indicating audio signals stored in the memory 212, and the reproduced result is output as the audio signal (Sin) to the sound output unit 215 and the interface 216. In this case, the controller 211 acquires information, indicating whether the speaker device 10 is connected to the communication device 20, from the communication controller 253. If the speaker device 10 is connected to the communication device 20, the output of the audio signal (Sin) toward the sound output unit 215 may stop. Otherwise, if the speaker device 10 is not connected to the communication device 20, the output of the audio signal (Sin) toward the interface 216 may stop.

The interface 251 is connected to an external device, and is used as a connection terminal for conducting I/O operations of various data. In this example, the portable audio device 21 is connected to the interface 251, and the audio signal (Sin) passed from the interface 216 of the portable audio device 21 is output to the wireless communication unit 252.

The wireless communication unit 252 establishes a wireless communication in a physical level by searching for the speaker device 10 present in a communication range corresponding to an output radio field intensity, and communicates with the found speaker device 10 by controlling the communication controller 253. As described above, in the case where the wireless communication unit 252 of the communication device 20 wirelessly communicates with the wireless communication unit 151 of the speaker device 10 such that the connection between the speaker device 10 and the communication device 20 is commenced, the wireless communication unit 252 encodes the output audio signal (Sin) fed from the interface 251 until the above connection is severed, and outputs the encoded audio signal (Sin) to the speaker device 10.

In this case, transmission of the audio signal (Sin) may be performed only when the speaker device 10 is connected to the communication device 20, or may also be performed irrespective of this connection state between the speaker device 10 and the communication device 20. Therefore, if the connection state is not obtained, there may be no need to acquire the audio signal (Sin) by the speaker device 10

The communication controller 253 controls communication of the wireless communication unit 252. The communication controller 253 performs the above control operation by transferring a signal indicating control content to the wireless communication unit 252. The communication controller 253 controls to connect with the speaker device 10, which has established a wireless communication at the physical level using the wireless communication unit 252. In this case, if a predetermined connection condition is satisfied in the same manner as in the communication controller 152 of the speaker device 10, the communication controller 253 controls the wireless communication unit 252 to establish a connection to the speaker device 10 in logical layer. In addition, if a predetermined disconnection condition is satisfied after the communication controller 253 is connected to the speaker device 10, the connection between the communication controller 253 and the speaker device 10 is severed such that the above connection is closed. In addition, the communication controller 253 may change the radio field intensity generated from the wireless communication unit 252 in response to an operation of the operation unit (not shown) or the like, such that the communication range may also be changed. The above-mentioned description has disclosed constituent components of the communication device 20.

Figure 4:
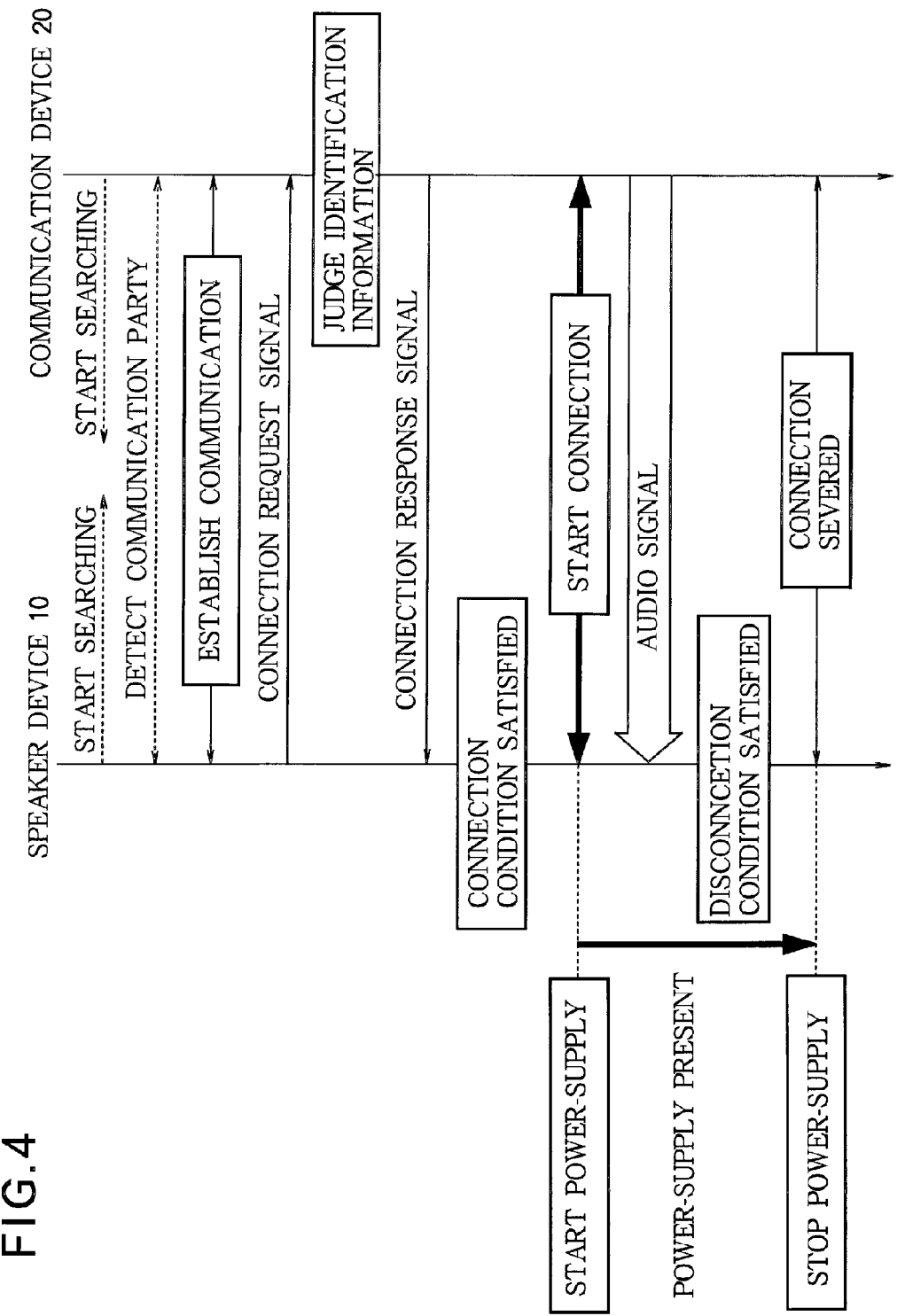
FIG. 4 is a flow chart illustrating wireless communication between the speaker device and the communication device according to an embodiment of the present invention.

Next, operations of the speaker device 10 and the communication device 20 contained in the audio system 1 will be described with reference to FIG. 4. FIG. 4 is a flow chart illustrating wireless communication between the speaker device 10 and the communication device 20. FIG. 4 assumes that the speaker device 10 is pre-installed, the communication device 20 is carried by a user, and the user moves from an out-of-communication range of the speaker device 10 into a communication range and then exits this communication range. In addition, FIG. 4 also assumes that audio signals may be reproduced by the user's operation in the portable audio device 21 of the communication device 20. In this case, the wireless communication between the speaker device 10 and the communication device 20 will hereinafter be described in detail.

First of all, if the speaker device 10 and the communication device 20 are located outside of their mutual communication range, they are searching for a communication party capable of establishing wireless communication. In this case, the amplifier 103 of the speaker device 10 is not powered on. Thereafter, if the user moves from a current position to another position such that the communication device 20 enters the communication range of the speaker device 10, the speaker device 10 and the communication device 20 detect the communication party, and the wireless communication between the wireless communication unit 151 of the speaker device 10 and the other wireless communication unit 252 of the communication device 20 is established at a physical level.

If the above wireless communication is established, the wireless communication unit 151 transmits a connection request signal to the communication device 20 upon receiving a control signal from the communication controller 152 of the speaker device 10. The connection request signal includes not only information requesting the connection to the communication device 20 but also identification information (e.g., a device identifier (ID), a group ID, product information, manufacturer information, and the like), to the communication device 20. The speaker device 10 transmits the connection request signal and waits for a decision indicating whether a connection condition is satisfied. In this example, the connection condition indicates that the speaker device 10 receives a connection response signal, indicating a connection approval transferred from the communication device 20, in response to the above connection request signal.

If the communication device 20 receives the connection request signal from the speaker device 10 through the wireless communication unit 252, the communication controller 253 decides the connection or disconnection to the speaker device 10 by analyzing the identification information. This decision based on the analysis of the identification information may be carried out as shown in the following. The communication controller 253 stores a list indicating pre-accessible identification information, and compares the stored list with identification information contained in the connection request signal. If identification information coinciding with the above identification information is present, the communication controller 253 decides the connection to the speaker device 10 in a logical level. Otherwise, if there is no identification information coinciding with the above identification information, the communication controller 253 decides the disconnection from the speaker device 10.

In addition, the above-mentioned decision may also be carried out by the user who operates the operation unit 213 to decide the connection or disconnection. In this case, identification information contained in the connection request signal is output to the portable audio device 21 through the interfaces 251 and 216, and indication information corresponding to the output identification information may be displayed on the display 214. In detail, an indication message, which specifies the speaker device 10 serving as a connection candidate to which wireless communication has been established, for example, a device ID, may be displayed on the display 214. The user confirms the above indication displayed on the display 214, and decides the connection or non-connection to the speaker device 10 by operating the operation unit 213. Information indicating this decision is output to the communication module 25 through the interfaces 216 and 251, such that the communication controller 253 determines the connection or non-connection to the speaker device 10.

If it is determined that the communication device 20 is connected to the speaker device 10, the communication device 20 transmits a connection response signal indicating connection approval to the speaker device 10. Otherwise, if it is determined that the communication device 20 is not connected to the speaker device 10, the communication device 20 need not transmit the connection response signal, or may also transmit the connection response signal indicating connection disapproval.

If the communication controller 152 of the speaker device 10 receives a connection response signal indicating the connection approval through the wireless communication unit 151, the communication controller 152 determines that the above-mentioned connection condition is satisfied, establishes the connection by the wireless communication between the speaker device 10 and the communication device 20, such that the speaker device 10 is connected to the communication device 20. The controller 101 controls the power-supply unit 102 to power on the amplifier 103. Accordingly, the audio signal (Sin) acquired by the wireless communication unit 151 is transmitted to the amplifier 103, and the amplifier 103 amplifies the audio signal (Sin), such that the audio signal reproduced by the portable audio device 21 is generated from the sound generator 120 of the speaker device 10 wirelessly connected to the communication device 20.

In this case, the communication controller 152 of the speaker device 10 continually decides a connection condition during a given period. However, if the communication controller 152 does not receive the connection response signal indicating the connection approval through the wireless communication unit 151 during the given period, the communication controller 152 maintains the wireless communication status without performing the connection to the communication device 20, and searches for the presence or absence of another communication device 20 in the communication range. If the presence of another communication device 20 to which the wireless communication may be established is determined, the communication controller 152 attempts to perform connection to the determined communication device 20.

In this way, the speaker device 10 is connected to one communication device 20 by wireless communication. Meanwhile, the communication device 20 may also be connected to a plurality of speaker devices 10 by wireless communication. In this case, the audio signal reproduced by the portable audio device 21 is generated from several speaker devices 10.

Next, if the speaker device 10 starts the connection to the communication device 20, the speaker device 10 continually decides whether a disconnection condition is satisfied. In this example, the disconnection condition may be satisfied when the communication device 20 moves out of communication range or when the communication module 25 is separated from the portable audio device 21, such that wireless communication is broken.

If the user carrying the communication device 20 moves such that he or she is out of the communication range, the wireless communication between the speaker device 10 and the communication device 20 is not established, and therefore it is determined that the communication controller 152 of the speaker device 10 and the communication controller 253 of the communication device 20 satisfy the above-mentioned disconnection condition, such that the connection between the speaker device 10 and the communication 20 is severed. The controller 101 of the speaker device 10 allows the power-supply unit 102 to stop powering on the amplifier 103, and does not acquire the audio signal (Sin) from the wireless communication unit 252, such that the sound generator 120 of the speaker device 10 stops generating the sound.

In this way, in the audio system 1 according to an embodiment of the present invention, since the user carrying the communication device 20 moves into the communication range of the speaker device 10, the speaker device 10 is connected to the communication device 20 by wireless communication, and the controller 101 of the speaker device 10 controls to power on the amplifier 103, such that the audio signal (Sin) reproduced by the portable audio device 21 of the communication device 20 can be generated from the sound generator 120 of the speaker device 10.

In addition, if the user moves out of the communication range of the speaker device 10 so that the wireless communication cannot be established, the controller 101 of the speaker device 10 controls to power off the amplifier 103, such that the sound generator 120 stops generating the sound. Therefore, the user need not specially operate the speaker device 10, is able to hear the sound generated from the sound generator 120 of the speaker device 10, and is able to control the power supplied to the amplifier 103 of the speaker device 10.

Although the above-mentioned description has disclosed the embodiment of the present invention, it should be noted that the present invention can be implemented in various ways shown in the following description.

MODIFIED EXAMPLE 1

In the above-mentioned embodiment, although the audio signal (Sin) has been transferred from the communication device 20 to the speaker device 10, a control signal (Sc) (for example, a volume value) indicating a control value or the like may also be transferred to the speaker device 10. In order to transfer the control signal (Sc) to the speaker device 10, it is preferable that the following operations be carried out. Firstly, the user operates the operation unit 213 of the communication device 20 to designate a volume value. The controller 211 acquires the operation signal from the operation unit 213, generates a control signal (Sc) indicating the designated volume value, and outputs the control signal (Sc) to the communication module 25 via the interfaces 216 and 251. The communication controller 253 transmits the output control signal (Sc) through the wireless communication unit 252. In this case, a channel over which the control signal (Sc) is communicated and another channel over which the audio signal (Sin) is transmitted are set to be equal whereas they have different frequencies. Differently from the audio signal (Sin), if another channel is occupied for the control signal (Sc) having a low frequency of use, the efficiency of use of this occupied channel is deteriorated, such that this channel occupation may be undesirable. Accordingly, it is more preferable that the control signal (Sc) be mixed in the channel occupied for the audio signal (Sin) and communicated through free time slots present in the communicated audio signal (Sin), than the use of another channel occupied for the control signal (Sc).

In addition, the controller 211 adjusts an output level of the audio signal (Sin) generated from the sound output unit 215 in response to the control signal (Sc). In this case, the output level of the audio signal (Sin) transferred to the interface 216 is not adjusted. Since the output level of the audio signal (Sin) is not adjusted before the audio signal (Sin) is transferred to the speaker device 10, a high signal-to-noise ratio (SNR) is maintained such that the deterioration of sound quality may be decreased. Also, the controller 211 may control the display 214 to display thereon a volume value corresponding to the control signal (Sc).

In the meantime, the wireless communication unit 151 of the speaker device 10 receives and acquires the control signal (Sc) transferred from the communication device 20 wirelessly connected to the speaker device 10. As shown in FIG. 2, the control signal (Sc) is transferred to the controller 101. The controller 101 controls the amplifier 103 to set an amplification factor corresponding to the volume value denoted by the control signal (Sc). In this way, the control signal (Sc) as well as the audio signal (Sin) may be transferred from the communication device 20 to the speaker device 10.

MODIFIED EXAMPLE 2

Figure 5:
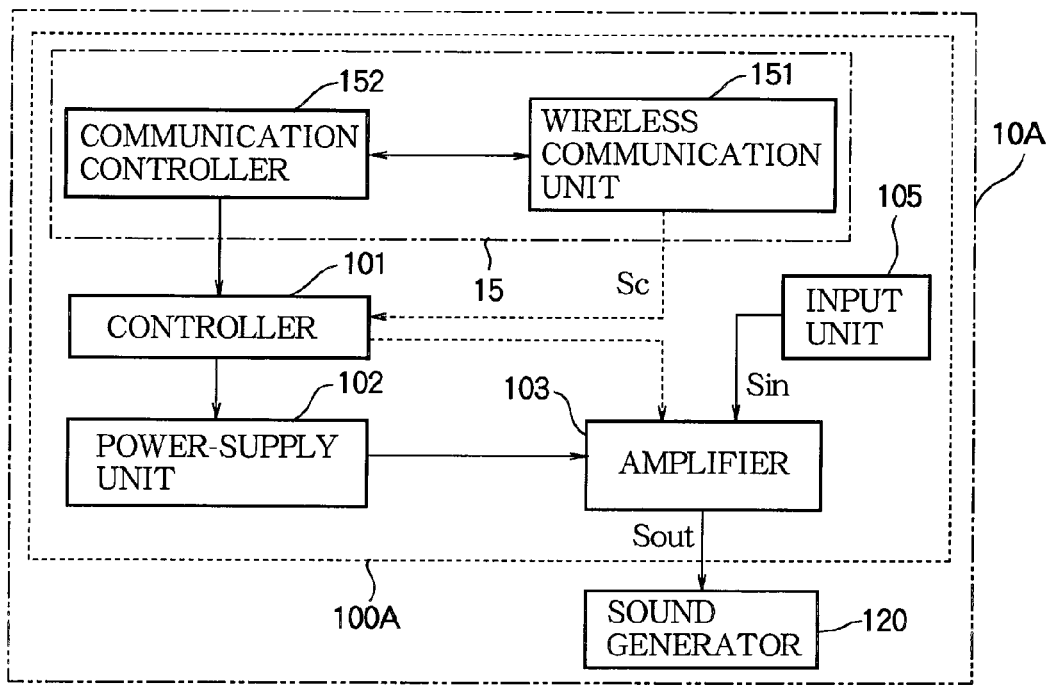
FIG. 5 is a block diagram illustrating a speaker device associated with a second modified example.

In the above-mentioned embodiment, the audio signal (Sin) is transferred from the communication device 20 to the speaker device 10, and the speaker device 10 receives and acquires the audio signal (Sin) through the wireless communication unit 151, however, the acquisition of the audio signal (Sin) may be carried out by another method. In this case, as shown in FIG. 5, the speaker device 10A may be used, which includes an input unit 105 for acquiring the audio signal (Sin) and outputting it to the amplifier 103.

The input unit 105 may include an input terminal for receiving the audio signal (Sin), such that the input unit 105 may acquire the audio signal (Sin) entered from the input terminal. If the input unit 105 includes a musical sound generator (not shown) for generating the audio signal (Sin), the input unit 105 may acquire the audio signal (Sin) from the musical sound generator.

Under the above-mentioned situation, the portable audio device 21 of the communication device 20 need not output the audio signal (Sin). If the user carrying the communication device 20 moves into the communication range of the speaker device 10, the audio signal (Sin) acquired by the input unit 105 of the speaker device 10 may be generated from the sound generator 120. Also, as shown in the above-mentioned modified example 1, if the control signal (Sc) is transferred from the communication device 20 to the speaker device 10, the user may use the communication device 20 like a remote-controller capable of changing the volume of output sound.

MODIFIED EXAMPLE 3

In the above-mentioned embodiment, the connection condition for starting the wireless communication connection between the speaker device 10 and the communication device 20 is set, when the speaker device 10 transmits the connection request signal, then the communication device 20 generates the connection response signal indicating the connection approval in response to the connection request signal, and finally the connection response signal is received in the speaker device 10. However, another connection condition may also be used as necessary. For example, a condition for establishing wireless communication connection between the speaker device 10 and the communication device 20 without transmitting and receiving the connection request signal and the connection response signal may be set as the connection condition as necessary.

For another example, the transmission/reception relationship between the connection request signal and the connection response signal is reversed, in such a manner that the connection request signal is transferred from the communication device 20 to the speaker device 10, and the speaker device 10 transmits the connection response signal in response to the connection request signal so that the connection response signal is finally received in the communication device 20. In addition, a specific operation whereby the communication device 20 receives the connection response signal indicating the connection approval may be set to a connection condition. In this case, the communication controller 253 of the communication device 20 may determine the connection or non-connection by judging whether the connection condition is satisfied.

In the meantime, the disconnection condition may be set to an exemplary condition where the wireless communication cannot be established, and may also be set to another condition as necessary. For example, in the case where no audio signal (Sin) is received from the communication device 20 wirelessly connected to the speaker device 10 during a predetermined time (for example, 10 minutes), this case may be set to the disconnection condition. Also, as shown in the modified example 1, if the control signal (Sc) is transferred from the communication device 20, the reception of a predetermined control signal (Sc) (for example, a signal indicating status information, such as a sleep mode, of the portable audio device 21, the sleep mode indicating that the remaining capacity of a battery of the portable audio device 21 is equal to or less than a predetermined battery capacity) may be set to the disconnection condition.

Also, the wireless communication unit 151 of the speaker device 10 includes a detection unit for detecting the radio field intensity propagated from the communication device 20. The communication controller 152 may acquire this detection result, and may determine a condition corresponding to the detected radio field intensity to meet a connection condition or not, such that the communication controller 152 may determine whether the speaker device 10 is connected to the communication device 20 on the basis of the determined result. For example, in the case where the radio field intensity generated from the communication device 20 to which the wireless communication has been established, is equal to or higher than a predetermined threshold value, this case may be determined to meet the connection condition. Otherwise, in the case where the radio field intensity generated from the communication device 20 is less than the predetermined threshold value, this case may be determine to meet the disconnection condition.

If the connection or disconnection condition is set as described above, the communication controller 152 increases or decreases a predetermined threshold value in response to an operation or the like of the operation unit (not shown) without changing the radio field intensity propagated by wireless communication, the range from the speaker device 10 may be adjusted in a given range in which the speaker device 10 is connected to the communication device 20 by wireless communication.

In addition, as shown in the modified example 1, in the case where transmission and reception of the control signal (Sc) are conducted in such a manner that this control signal (Sc) can be transmitted or received before the beginning time of the wireless communication connection between the speaker device 10 and the communication device 20, the threshold value may be increased or decreased in response to the control signal (Sc). For example, if the control signal (Sc) indicates a volume value, the threshold value is decreased in proportion to the increasing volume value, such that a distance within which the speaker device 10 can be connected to the communication device 20 by wireless communication may be increased.

In addition, in this example, although the speaker device 10 detects the radio field intensity, the wireless communication unit 252 of the communication device 20 may include a detection unit for detecting the radio field intensity, and the connection condition may be judged by the communication controller 253.

The above-mentioned various connection conditions may be performed independent of each other, or the combination of several conditions may be performed. For example, the above combination of several conditions may be set to an exemplary status in which one condition in the embodiments and another condition corresponding to the radio field intensity are simultaneously satisfied.

MODIFIED EXAMPLE 4

In the above-mentioned embodiment, if the speaker device 10 is connected to the communication device 20 by wireless communication, the controller 101 of the speaker device 10 transmits and receives the control signal (Sc) as shown in the first modified example 1, under the condition that the amplifier 103 starts receiving power from the power-supply unit 102. If the controller 101 receives the control signal (Sc) having predetermined contents from the communication device 20 after the speaker device 10 is wirelessly connected to the communication device 20, it is preferable that the controller 102 control the power-supply unit 102 to start powering on the amplifier 103.

In this case, the control signal (Sc) having the predetermined contents may be set to indicate a volume value as exemplarily shown in the first modified example 1, or may be set to another control signal (Sc) generated by the portable audio device 21 when reproducing audio signals. Under this situation, even if the speaker device 10 is connected to the communication device 20, it is possible to prevent the sound generator 120 of the speaker device 10 from generating sound until the user conducts a predetermined operation on the operation unit 213 of the portable audio device 21. Namely, it is possible to prevent the sound generator 120 from unnecessarily generating sound when the user carrying the communication device 20 simply passes by the speaker device 10.

MODIFIED EXAMPLE 5

In the above-mentioned embodiment, the decision made by identification information estimation of the communication controller 253 of the communication device 20 is carried out by comparing the list indicating pre-accessible identification information with another identification information contained in the connection request signal received from the speaker device 10, however, it should be noted that the above decision may also be carried out by other methods. For example, the following method may be used, and a detailed description thereof will be given.

Identification information in the speaker device 10 may be defined as a group ID (for example, group 1, 2, or 3), and this group ID may be set by an operation unit (not shown) such as a dip switch. In the meantime, in the same manner as in the communication module 25 of the communication device 20, a group ID of the communication module 25 may be set by an operation unit (not shown) such as a dip switch.

In the speaker device 10 and the communication device 20, if the wireless communication unit 252 of the communication device 20 receives the connection request signal having identification information indicating a group ID transferred from the speaker device 10, the communication controller 253 determines whether the group ID indicated by this identification information is equal to another group ID established by the communication module 25. If the two group IDs are equal to each other, the communication controller 253 controls the wireless communication unit 252 such that the connection response signal indicating connection approval is transferred to the speaker device 10.

A pair of the accessible speaker device 10 and the communication device 20 may be easily set as shown in the above-mentioned example. Since a group ID of each speaker device 10 is set on the condition that several speaker devices 10 are installed, the speaker device 10 wirelessly connected to the communication device 20 may be easily set.

MODIFIED EXAMPLE 6

Figure 6:
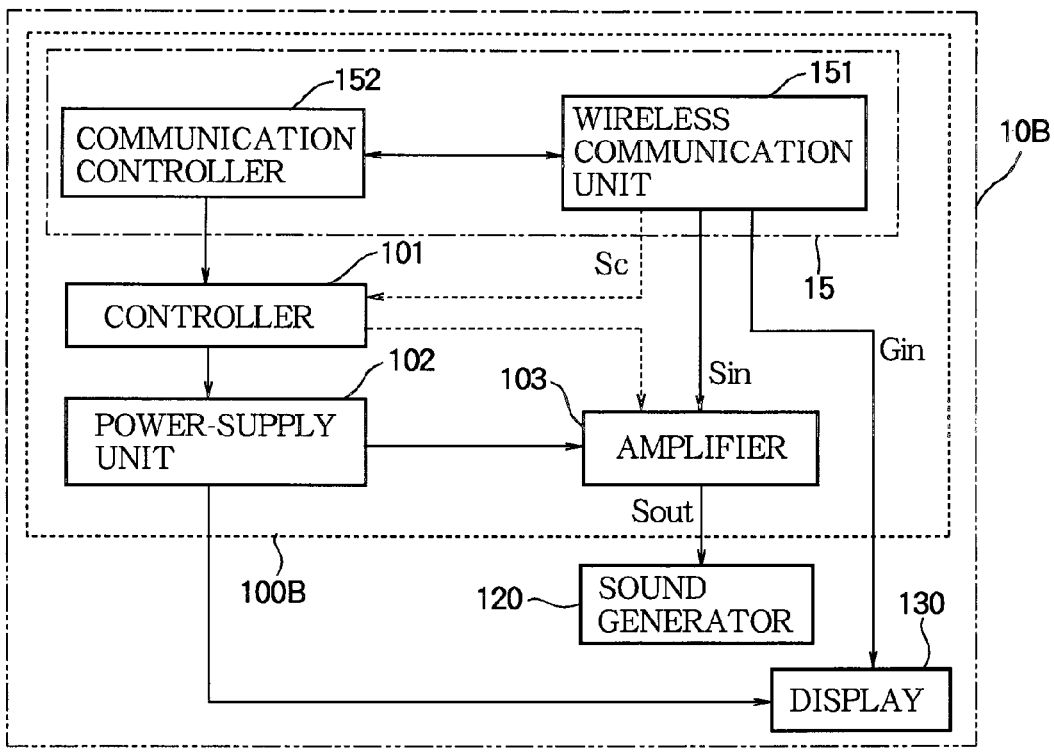
FIG. 6 is a block diagram illustrating a video display device associated with a sixth modified example.

Although the speaker device 10 for generating the audio signal (Sin) has been used in the above-mentioned example, a video display device 10B such as a television having a display 130 may also be used as shown in FIG. 6, such that the configuration of the video display device 10B will hereinafter be described.

The display 130 has a display screen, for example, a liquid crystal display (LCD) or an organic electroluminescent (EL) display. Upon receiving power from the power-supply unit 102, the display 130 displays image corresponding to an input video signal on the display screen. When the controller 101 controls the power-supply unit 102 to power on or off the amplifier 103, the display 130 is also powered on or off. In other words, when the video display device 10B is connected to the communication device 20, power is applied to the display 130. In addition, the wireless communication unit 151 receives and acquires a video signal (Gin) along with the audio signal (Sin) from the communication device 20, and outputs the video signal (Gin) on the display 130. Accordingly, the display 130 displays image corresponding to the video signal (Gin).

The memory 212 of the communication device 20 records and stores data of the video signal along with data of the audio signal therein. When the controller 211 of the communication device 20 reads data of the audio signal, it also reads and reproduces data of the video signal, such that the reproduced data is transferred as the video signal (Gin) to the display 214 and the interface 216. Thus, the video signal (Gin) is transferred from the wireless communication unit 252 along with the audio signal (Sin). In this case, the controller 211 acquires specific information, indicating whether the video display device 10B is connected to the communication device 20, from the communication controller 253. When the video display device 10B is connected to the communication device 20, the controller 211 may stop displaying the video signal (Gin) on the display 214. Otherwise, when the video display device 10B is disconnected from the communication device 20, the controller 211 may stop outputting the video signal (Gin) to the interface 216. The remaining structures except for the above-mentioned components are equal to those of the above-mentioned embodiment, such that a detailed description thereof will herein be omitted for convenience of description.

In this way, the present invention may be applied to not only a sound system for generating sound as in the speaker device 10, but also a display system for displaying video data as in the video display device 10B.

MODIFIED EXAMPLE 7

In the above-mentioned embodiment, the speaker device 10 has the audio signal processing device 100, and the amplifier 103 of the audio signal processing device 100 amplifies the audio signal (Sin). However, the scope of the present invention is not limited to only the amplifier 103, and the present invention may also use a signal processor for performing a predetermined signal process (e.g., an equalizing process, reverb process, or the like) on the audio signal (Sin) after receiving power.

MODIFIED EXAMPLE 8

Although the above-mentioned embodiment has described operations performed when the portable audio device 21 of the communication device 20 is connected to the communication module 25, when the portable audio device 21 is not connected to the communication module 25, the communication module 25 is not operated, and wireless communication is not established even if the communication device 20 enters the communication range of the speaker device 10.

If the portable audio device 21 is connected to the communication module within a communication range of the speaker device 10, the wireless communication unit 252 and the communication controller 253 in the communication module 25 receive power from the power-supply unit (not shown) of the portable audio device 21, so that they begin to operate and detect a communicable party, and wireless communication is established between the speaker device 10 and the communication device 20. Thereafter, the amplifier 103 of the speaker device 10 starts powering on in the same manner as in the above-mentioned embodiment, and the audio signal (Sin) reproduced by the portable audio device 21 is generated from the speaker device 10.

Thereafter, if the communication module 25 is separated from the portable audio device 21 such that a connection therebetween is released, the communication module 25 is not operated again. Therefore, it is impossible to establish wireless communication, a disconnection condition is satisfied, so that the amplifier 103 of the speaker device 10 is powered off and the speaker device 10 stops generating sound. In this way, if the communication module 25 is connected to or disconnected from the portable audio device 21 as described above, power applied to the speaker device 10 may be easily controlled by a simple handling such as the above connection or disconnection operation, without any other operations.

What is claimed is:

1. An audio signal processing device comprising:
an acquisition unit that acquires an audio signal which is wirelessly received from a communication device, the acquisition unit further receiving a control signal together with the audio signal from the communication device, the control signal indicating parameters for signal processing of the audio signal;
a signal processing unit that includes an amplifier for amplifying the audio signal and applies the signal processing to the audio signal acquired by the acquisition unit according to the parameters indicated by the control signal when the signal processing unit is supplied with power, and that outputs the audio signal for generation of sound;
a communication unit that establishes wireless communication with a communication device for connection to the communication device;
a communication controller that controls the communication unit to commence the connection to the communication device by the wireless communication when a predetermined connection condition is satisfied, and to sever the connection to the communication device when a predetermined disconnection condition is satisfied; and
a power control unit that starts supply of power to the signal processing unit for generation of sound when the connection to the communication device is commenced, and that stops the supply of power to the signal processing unit when the connection to the communication device is severed.

2. The audio signal processing device according to claim 1, wherein
the communication unit includes a detection unit that detects an intensity of a radio field propagated from the communication device, and
the communication controller determines whether the predetermined connection condition is satisfied or not according to the intensity of the radio field detected by the detection unit.

3. The audio signal processing device according to claim 1, wherein
the communication unit includes a detection unit that detects an intensity of a radio field propagated from the communication device, and the communication controller determines whether the predetermined disconnection condition is satisfied or not according to the intensity of the radio field detected by the detection unit.

4. The audio signal processing device according to claim 1, wherein
the communication unit transmits a request signal to the communication device, and receives a response signal to the request signal from the communication device, and
the communication controller determines whether the predetermined connection condition is satisfied or not according to the response signal received by the communication unit.

5. The audio signal processing device according to claim 1, wherein
the power control unit starts supply of power to the signal processing unit when the power control unit additionally receives a predetermined signal from the communication device after the connection is commenced.

6. An audio signal processing device comprising:
an acquisition unit that acquires an audio signal which is wirelessly received from a communication device, the acquisition unit further receiving a control signal together with the audio signal from the communication device, the control signal indicating parameters for signal processing of the audio signal;
a signal processing unit that includes an amplifier for amplifying the audio signal and applies the signal processing to the audio signal acquired by the acquisition unit according to the parameters indicated by the control signal when the signal processing unit is supplied with power, and that outputs the audio signal for generation of sound;
a communication unit that searches a communication device present in a communication range after power is supplied to the communication unit, and that establishes wireless communication for connection to the communication device which is searched by the communication unit;
a communication controller that controls the communication unit to commence the connection to the communication device by the wireless communication when a predetermined connection condition is satisfied, and that severs the connection to the communication device when a predetermined disconnection condition is satisfied; and
a power control unit that holds a first power-supply state where the communication unit is supplied with power and the signal processing unit is not supplied with power before the connection by the wireless communication to the communication device is commenced, that switches the first power-supply state to a second power-supply state where the communication unit is supplied with power and the signal processing unit is supplied with power for generation of sound when the connection to the communication device is commenced, and that restores the first power supply state where the communication unit is supplied with power and the signal processing unit is not supplied with power when the connection to the communication device is severed.

7. The audio signal processing device according to claim 6, wherein
the communication unit includes a detection unit that detects an intensity of a radio field propagated from the communication device, and
the communication controller determines whether the predetermined connection condition is satisfied or not according to the intensity of the radio field detected by the detection unit.

8. The audio signal processing device according to claim 6, wherein
the communication unit includes a detection unit that detects an intensity of a radio field propagated from the communication device, and
the communication controller determines whether the predetermined disconnection condition is satisfied or not according to the intensity of the radio field detected by the detection unit.

9. The audio signal processing device according to claim 6, wherein
the communication unit transmits a request signal to the communication device, and receives a response signal to the request signal from the communication device, and
the communication controller determines whether the predetermined connection condition is satisfied or not according to the response signal received by the communication unit.

10. The audio signal processing device according to claim 6, wherein
the power control unit starts supply of power to the signal processing unit when the power control unit additionally receives a predetermined signal from the communication device after the connection is commenced.

11. A speaker device comprising:
an acquisition unit that acquires an audio signal which is wirelessly received from a communication device, the acquisition unit further receiving a control signal together with the audio signal from the communication device, the control signal indicating parameters for signal processing of the audio signal;
a signal processing unit that includes an amplifier for amplifying the audio signal and applies the signal processing to the audio signal acquired by the acquisition unit according to the parameters indicated by the control signal when the signal processing unit is supplied with power, and that outputs the audio signal for generation of sound;
a sound generator that generates sound according to the audio signal outputted from the signal processing unit;
a communication unit that establishes wireless communication with a communication device for connection to the communication device;
a communication controller that controls the communication unit to commence the connection to the communication device by the wireless communication when a predetermined connection condition is satisfied, and to sever the connection to the communication device when a predetermined disconnection condition is satisfied; and
a power control unit that starts supply of power to the signal processing unit for generation of sound when the connection to the communication device is commenced, and that stops the supply of power to the signal processing unit when the connection to the communication device is severed.

12. A video display device comprising:
an acquisition unit that acquires an audio signal and a video signal which are wirelessly received from a communication device, the acquisition unit further receiving a control signal together with the audio signal from the communication device, the control signal indicating parameters for signal processing of the audio signal;

a signal processing unit that includes an amplifier for amplifying the audio signal and applies the signal processing to the audio signal acquired by the acquisition unit according to the parameters indicated by the control signal when the signal processing unit is supplied with power, and that outputs the audio signal for generation of sound;

a sound generator that generates sound according to the audio signal outputted from the signal processing unit;

a display unit that has a display screen and that displays image on the display screen according to the video signal acquired by the acquisition unit when the display unit is supplied with power;

a communication unit that establishes wireless communication with a communication device for connection to the communication device;

a communication controller that controls the communication unit to commence the connection to the communication device by the wireless communication when a predetermined connection condition is satisfied, and to sever the connection to the communication device when a predetermined disconnection condition is satisfied; and a power control unit that starts supply of power to the signal processing unit for generation of sound and the display unit when the connection to the communication device is commenced, and that stops the supply of power to the signal processing unit and the display unit when the connection to the communication device is severed.

13. A control method for use in an audio signal processing device, which includes an acquisition unit for acquiring an audio signal which is wirelessly received from a communication device, the acquisition unit further receiving a control signal together with the audio signal from the communication device, the control signal indicating parameters for signal processing of the audio signal, a signal processing unit for applying the signal processing to the audio signal acquired by the acquisition unit according to the parameters indicated by the control signal after power is supplied and outputting the audio signal for generation sound, the signal processing unit including an amplifier for amplifying the audio signal, and a communication unit for establishing wireless communication for connection to the communication device, the control method comprising:

a connection-start control step for controlling the communication unit to commence the connection to the communication device by the wireless communication when a predetermined connection condition is satisfied;

a power-supply start control step for starting supply of power to the signal processing unit for generation of sound when the connection to the communication device is commenced;

a connection-severing control step for controlling the communication unit to server the connection to the communication device when a predetermined disconnection condition is satisfied; and a power-supply stop control step for stopping supply of power to the signal processing unit when the connection to the communication device is severed.

14. A control method for use in an audio signal processing device, which includes an acquisition unit for acquiring an audio signal, which is wirelessly received from a communication device, the acquisition unit further receiving a control signal together with the audio signal from the communication device, the control signal indicating parameters for signal processing of the audio signal, a signal processing unit for applying the signal processing to the audio signal acquired by the acquisition unit according to the parameters indicated by the control signal after power is supplied and outputting the audio signal for generation sound, the signal processing unit including an amplifier for amplifying the audio signal, and a communication unit for searching the communication device present in a communication range after power is supplied and establishing wireless communication for connection to the communication device which is searched, the control method comprising:

a first power-supply control step for holding a first power-supply state where the communication device is supplied with power and the signal processing unit is not supplied with power before the connection to the communication device is commenced;

a connection-commencing control step for controlling the communication unit to commence the connection to the communication device by the wireless communication when a predetermined connection condition is satisfied;

a power-supply control step for switching the first power-supply state to a second power-supply state where the communication device is supplied with power and the signal processing unit is supplied with power for generation of sound when the connection to the communication unit is commenced;

a connection-severing control step for controlling the communication unit to sever the connection to the communication device when a predetermined disconnection condition is satisfied; and a power-supply stop control step for restoring the first power-supply state where the communication device is supplied with power and the signal processing unit is not supplied with power when the connection to the communication device is severed.

* * * * *